(12) United States Patent
Fu et al.

(10) Patent No.: US 12,452,830 B2
(45) Date of Patent: Oct. 21, 2025

(54) INFORMATION PROCESSING METHOD BASED ON NETWORK SLIDE IDENTITY INFORMATION IN ACCESS PROCEDURE, AND TERMINAL DEVICE

(71) Applicant: GUANGDONG OPPO MOBILE TELECOMMUNICATIONS CORP., LTD., Dongguan (CN)

(72) Inventors: Zhe Fu, Dongguan (CN); Shukun Wang, Dongguan (CN); Cong Shi, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 399 days.

(21) Appl. No.: 18/092,182

(22) Filed: Dec. 30, 2022

(65) Prior Publication Data
US 2023/0199709 A1    Jun. 22, 2023

Related U.S. Application Data

(63) Continuation of application No. PCT/CN2020/102213, filed on Jul. 15, 2020.

(51) Int. Cl.
H04W 68/00 (2009.01)
H04W 74/0833 (2024.01)

(52) U.S. Cl.
CPC ....... H04W 68/00 (2013.01); H04W 74/0833 (2013.01)

(58) Field of Classification Search
CPC ............. H04W 68/00; H04W 74/0833; H04W 36/008357; H04W 36/26; H04W 48/20; H04W 76/10; H04W 76/12; H04W 76/19; H04W 76/22; H04W 76/32
See application file for complete search history.

(56) References Cited

U.S. PATENT DOCUMENTS

| 2017/0238284 | A1* | 8/2017 | Tseng ................... H04W 72/23 370/329 |
| 2017/0331577 | A1* | 11/2017 | Parkvall ............. H04L 65/1023 |
| 2017/0339609 | A1 | 11/2017 | Youn et al. |
| 2020/0374924 | A1* | 11/2020 | Liu ...................... H04W 76/11 |
| 2020/0413241 | A1* | 12/2020 | Park ..................... H04W 76/22 |
| 2021/0068073 | A1* | 3/2021 | Sivavakeesar ........ H04W 68/00 |

(Continued)

FOREIGN PATENT DOCUMENTS

| CN | 106851589 A | 6/2017 |
| CN | 109691194 A | 4/2019 |

(Continued)

OTHER PUBLICATIONS

International Search Report issued in International application No. PCT/CN2020/102213, mailed Mar. 30, 2021.

(Continued)

Primary Examiner — Liem H. Nguyen
(74) Attorney, Agent, or Firm — BAYES PLLC

(57) ABSTRACT

The present application relates to an information processing method, a terminal device, and a network device. The method includes: processing, by the terminal device, identity information of a first network slice and/or identity information of the terminal device to perform an access procedure.

9 Claims, 6 Drawing Sheets

(56) References Cited

U.S. PATENT DOCUMENTS

| | | | | |
|---|---|---|---|---|
| 2021/0099921 A1* | 4/2021 | Han | .................. | H04W 68/02 |
| 2022/0046580 A1* | 2/2022 | Park | .................. | H04W 74/0833 |
| 2022/0322444 A1* | 10/2022 | Wolfner | ............ | H04W 74/0833 |
| 2023/0224766 A1* | 7/2023 | Han | .................. | H04W 4/06 |
| | | | | 370/331 |

FOREIGN PATENT DOCUMENTS

| | | | |
|---|---|---|---|
| CN | 110418343 A | | 11/2019 |
| EP | 3512272 A1 | | 7/2019 |
| WO | WO-2017125025 A1 | * | 7/2017 |

OTHER PUBLICATIONS

Written Opinion of the International Searching Authority issued in International application No. PCT/CN2020/102213, mailed Mar. 30, 2021.

3GPP TS 38.331 V16.0.0 (Mar. 2020); Technical Specification Group Radio Access Network; NR; Radio Resource Control (RRC) protocol specification (Release 16).

3GPP TS 38.413 V16.1.0 (Mar. 2020); Technical Specification Group Radio Access Network; NG-RAN; NG Application Protocol (NGAP) (Release 16).

* cited by examiner

INFORMATION PROCESSING METHOD BASED ON NETWORK SLIDE IDENTITY INFORMATION IN ACCESS PROCEDURE, AND TERMINAL DEVICE

CROSS-REFERENCE TO RELATED APPLICATIONS

This application is a continuation of International Application No. PCT/CN2020/102213, filed Jul. 15, 2020, the entire disclosure of which is incorporated herein by reference.

TECHNICAL FIELD

Embodiments of the present disclosure generally relate to the communication technical field, and more specifically, to an information processing method, a terminal device and a network device.

BACKGROUND

Usually, when downlink data for a service needs to be sent to a terminal in an idle state, a network sends a paging message to the terminal so that the terminal knows that the network needs the terminal to enter a connected state to receive the data. After receiving the paging message, the terminal confirms that it needs to access the network and then starts a random access procedure.

For a terminal that enters the connected state, the following situation may exist in actual applications: the signal measurement result of a cell which the terminal currently accesses is good, but the cell cannot provide the terminal with a required network slice service, that is, the network slice service supported by the cell which the terminal accesses does not match the network slice service required by the terminal, which will lead to that some communication services of the terminal (such as vertical industry services) cannot be carried out. This has a huge impact on terminal performance and optimization is needed.

SUMMARY

Embodiments of the present disclosure provide an information processing method, a terminal device and a network device.

An embodiment of the present disclosure provides an information processing method, applied to a terminal device, the method including:

processing, by a terminal device, identity information of a first network slice and/or identity information of the terminal device to perform an access procedure.

An embodiment of the present disclosure provides an information processing method, applied to a network device, the method including:

processing, by a network device, identity information of a first network slice and/or identity information of a terminal device to make the terminal device perform an access procedure.

An embodiment of the present disclosure further provides a terminal device, including:

an information processing module configured to process identity information of a first network slice and/or identity information of the terminal device to perform an access procedure.

An embodiment of the present disclosure further provides a network device, including:

an information processing module configured to process identity information of a first network slice and/or identity information of a terminal device to make the terminal device perform an access procedure.

An embodiment of the present disclosure further provides a terminal device, including: a processor and a memory, wherein the memory is used for storing a computer program, and the processor is configured to call and run the computer program stored in the memory to perform the above methods.

An embodiment of the present disclosure further provides a network device, including: a processor and a memory, wherein the memory is used for storing a computer program, and the processor is configured to call and run the computer program stored in the memory to perform the above methods.

An embodiment of the present disclosure further provides a chip, including: a processor configured to call and run a computer program from a memory to cause a device in which the chip is installed to perform the above methods.

An embodiment of the present disclosure further provides a computer-readable storage medium for storing a computer program, wherein the computer program causes a computer to perform the above methods.

An embodiment of the present disclosure further provides a computer program product including computer program instructions which cause a computer to perform the above methods.

An embodiment of the present disclosure further provides a computer program which causes a computer to perform the above methods.

According to the embodiments of the present disclosure, in the access procedure of the terminal device, the terminal device can perform the access procedure according to the identity information of the terminal device, and can also perform the access procedure based on the processing of the network slice identity information. By taking the network slice identity information into consideration, the terminal device not always complete the access according to, for example, the communication quality or signal strength, and the network slice information can also affect the access procedure, which can improve the performance of the terminal device to a certain extent.

DETAILED DESCRIPTION

Figure 1:
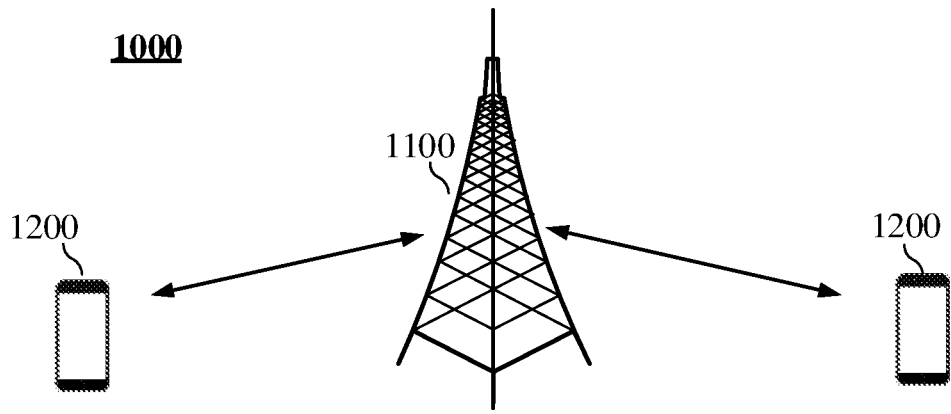
FIG. 1 is a schematic diagram of a communication system architecture according to an embodiment of the present disclosure.

The technical solutions in embodiments of the present disclosure will be described below with reference to the drawings in the embodiments of the present disclosure.

Technical solutions according to embodiments of the present disclosure can be applied to various communication systems, such as, Global System of Mobile communication (GSM) system, Code Division Multiple Access (CDMA) system, Wideband Code Division Multiple Access (WCDMA) system, General Packet Radio Service (GPRS), Long Term Evolution (LTE) system, Advanced Long Term Evolution (LTE-A) system, New Radio (NR) system, evolution system of NR system, LTE-based access to unlicensed spectrum (LTE-U) system, NR-based access to unlicensed spectrum (NR-U) system, Non-Terrestrial Networks (NTN) system, Universal Mobile Telecommunication System (UMTS), Wireless Local Area Networks (WLAN), Wireless Fidelity (WiFi), 5th-Generation (5G) system, or other communication systems, etc.

Generally speaking, traditional communication systems support a limited number of connections and are easy to implement. However, with the development of communication technologies, mobile communication systems will not only support traditional communications, but also support, for example, Device to Device (Device to Device, D2D) communications, Machine to Machine (M2M) communications, Machine Type Communication (MTC), Vehicle to Vehicle (V2V) communications, or Vehicle to everything (V2X), etc. Embodiments of the present disclosure can be applied to these communications systems.

Optionally, the communication systems in embodiments of the present disclosure can be applied to a Carrier Aggregation (CA) scenario, can also be applied to a Dual Connectivity (DC) scenario, and can also be applied to a standalone (SA) network deployment scenario.

Embodiments of the present disclosure are described in combination with a terminal device and a network device. The terminal device may also be called User Equipment (UE), access terminal, user unit, user station, mobile station, mobile terminal, remote station, remote terminal, mobile device, user terminal, terminal, wireless communication device, user agent or user device, etc.

The terminal device can be a station (ST) in a WLAN, a cellular phone, a cordless phone, a Session Initiation Protocol (SIP) phone, a Wireless Local Loop (WLL) station, or a Personal Digital Assistant (PDA) device, a handheld device with wireless communication capabilities, a computing device or other processing device connected to a wireless modem, a vehicle-mounted device, a wearable device, or a terminal device in a next-generation communication system, such as a terminal device in the NR network or a terminal device in a future evolved Public Land Mobile Network (PLMN) network.

In embodiments of the present disclosure, the terminal device may be deployed on land, including indoor or outdoor, handheld, wearable or vehicle-mounted; or, the terminal device may be deployed on water (such as on ships, etc.); or, the terminal device may be deployed in the air (such as on aircraft, balloons, and satellites, etc.).

In embodiments of the present disclosure, the terminal device may be a mobile phone, a tablet computer (Pad), a computer with wireless transceiver function, a virtual reality (VR) terminal device, an augmented reality (AR) terminal device, a wireless terminal device in industrial control, a wireless terminal device in self driving, a wireless terminal devices in remote medical, a wireless terminal device in smart grid, a wireless terminal device in transportation safety, a wireless terminal device in smart city, or a wireless terminal device in smart home, etc.

By way of example and not limitation, in embodiments of the present disclosure, the terminal device may also be a wearable device. The wearable device can also be referred to as a wearable smart device, which is a general term for applying wearable technology to intelligently design everyday wear and develop wearable devices, such as glasses, gloves, watches, clothing and shoes. A wearable device is a portable device that is worn directly on the body or integrated into users' clothes or accessories. The wearable device is not only a hardware device, but also realize powerful functions through software support, data interaction, and cloud interaction. Generalized wearable smart devices include full-featured and large-sized devices which can realize complete or partial functions that do not depend on smart phones, such as smart watches or smart glasses, and devices that only focus on a certain type of application functions, and need to cooperate with other devices like smart phones, such as smart bracelets for sign monitoring, or smart jewelry.

In embodiments of the present disclosure, the network device may be a device for communicating with a mobile device. The network device may be an Access Point (AP) in WLAN, a base station (BTS, Base Transceiver Station) in GSM or CDMA, or a base station (NB, NodeB) in WCDMA, an evolved base station in LTE (Evolutional Node B, eNB or eNodeB), or a relay station or an access point, or a vehicle-mounted device, a wearable device, a network device (gNB) in an NR network, or a network device in future evolved PLMN network.

By way of example and not limitation, in embodiments of the present disclosure, the network device may have mobile characteristics, for example, the network device may be a mobile device. Optionally, the network device may be a satellite, a or balloon station. For example, the satellite may be a Low Earth Orbit (LEO) satellite, a Medium Earth Orbit (MEO) satellite, a Geostationary Earth Orbit (GEO) satellite, or a High Elliptical Orbit (HEO) satellite, etc. Optionally, the network device may also be a base station deployed on land, or water, etc.

In embodiments of the present disclosure, the network device provides services for a cell, and the terminal device communicates with the network device through transmission resources (for example, frequency domain resources, or spectrum resources) used by the cell. The cell may be a cell corresponding to the network device (for example, base station). The cell may belong to a macro base station or a base station corresponding to a small cell. The small cell here may include: a metro cell, a micro cell, a pico cell, a femto cell, etc. These small cells have the characteristics of small coverage and low transmit power, and are suitable for providing high-speed data transmission services.

FIG. 1 exemplarily shows one network device 1100 and two terminal devices 1200. According to some embodiments, the wireless communication system 1000 may include multiple network devices 1100 and the coverage of each network device 1100 may include other numbers of terminal devices, and embodiments of the present disclosure do not impose specific limitations on this.

According to some embodiments, the wireless communication system 1000 shown in FIG. 1 may further include other network entities such as a Mobility Management Entity (MME), or an Access and Mobility Management Function (AMF), which are not limited in embodiments of the present disclosure.

It should be understood that the terms "system" and "network" are often used interchangeably herein. The term "and/or" herein is an association relationship to describe associated objects, indicating that there can be three kinds of relationships between the associated objects, for example, A and/or B can mean three cases: A alone, B alone, and A and B together. In addition, the character "/" herein generally indicates that the related objects before and after the character are an "or" relationship.

In order to clearly illustrate the idea of embodiments of the present disclosure, processes and procedure(s) related to access of a terminal device to a network in a communication system is first briefly described.

In this field, when downlink data for a service needs to be sent to a terminal in an idle state or in an inactive state, a network first sends paging information to the terminal, so that the terminal knows that the network needs the terminal to enter a connected state to receive the data. The processing procedure on the terminal side is roughly as follows:

1. The terminal tries to receive the paging message from the network at a fixed time point in a wakeup stage of each discontinuous reception cycle.

2. When the DCI indication information is detected by the terminal on the PDCCH, the terminal will know that the network may have a paging message to send to the terminal.

3. The terminal decodes the paging message on the PDSCH according to the indication of time-frequency resource allocation information given in the DCI indication information.

4. When the paging message is received:

a) For a terminal in the idle state: the terminal detects whether the "pagingRecord IE" contains a terminal identity "ue-Identity" which is the same as its own identity (ID). If the "pagingRecord IE" contains such terminal identity "ue-Identity", the terminal sends the "ue-Identity" and information about possible access type "accessType" to the higher layer, which indicates the MAC layer to perform the random access procedure.

b) For a terminal in the inactive state: the terminal detects whether the "pagingRecord IE" contains "ue-Identity" which is the same as the "full-RNTI" stored by the terminal itself. If the "pagingRecord IE" contains such "ue-Identity", the terminal performs a connection resumption procedure.

Regarding message 3 (msg3): RRCSetupRequest in the random access procedure, for a terminal in the idle state, the RRCSetupRequest sent in the contention-based random access carries its own ID. If the MAC PDU of msg4 received later contains a UE conflict resolution ID that matches the CCCH SDU sent by the terminal in msg3, the terminal wins the contention and the random access is successful.

Regarding msg3: RRCResumeRequest in the random access procedure, for a terminal in the inactive state, the purpose of sending RRCResumeRequest is to request the network to resume a suspended RRC connection. If the MAC PDU containing msg4: RRCResume received later contains a UE conflict resolution ID matching the CCCH SDU sent by the terminal in msg3, the terminal wins the contention, the random access is successful and the terminal resumes the connected state.

If the base station gNB refuses to establish an RRC connection for the UE, the base station sends an RRC reject message through the DL CCCH. The RRC reject message carries a timer, and the terminal is not allowed to access the cell until the timer times out.

The terminal sends an uplink NAS message to the core network via RRCSetupComplete signaling, informing the network of the purpose for the terminal to establish the connection, such as attach or detach. The terminal also reports the required network slice information to the base station, so that the base station can coordinate with the core network to establish a suitable PDU session tunnel.

The terminal sends the uplink NAS message to the core network via RRCResumeComplete signaling to inform the core network of the purpose for the terminal to resume the connection.

However, for the terminal that enters the connected state through the random access procedure, if the accessed cell cannot provide the required network slice service for the terminal, or the network slice service supported by the cell does not match the network slice service required by the terminal, this will result in that some services of the terminal cannot be carried out normally. According to the aforementioned access procedure, the procedure does not consider what to do when the network slice service currently supported by the cell does not meet the terminal's requirement, the terminal cannot quickly access to another suitable cell, and it is impossible to provide services to users in time. As can be seen from above, in the existing procedure, after the terminal enters the connected state, when a data service appears, the terminal cannot reconnect to a cell that matches the network slice required for the service in a timely manner.

Figure 2:
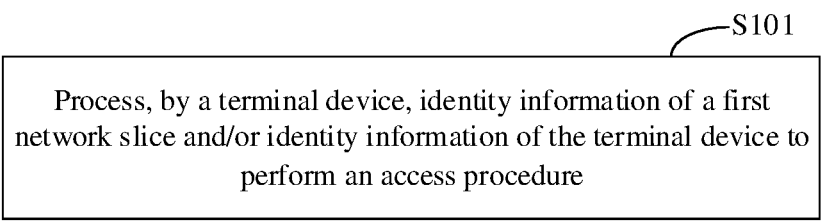
FIG. 2 is a flowchart of an information processing method on a terminal side according to an embodiment of the present disclosure.

To this end, an embodiment of the present disclosure provides an information processing method which is applied to a terminal device. Referring to FIG. 2, the method includes the following:

In S101, the terminal device processes identity information of a first network slice and/or identity information of the terminal device to perform an access procedure.

According to the embodiment of the present disclosure, in the access procedure of the terminal device, the terminal device may perform the access procedure according to the identity information of the terminal device, and may also perform the access based on the processing of the network slice identity information. By taking the network slice identity information into consideration, the terminal device does not always complete the access according to, for example, the communication quality or the signal strength, and the network slice information can also affect the access procedure, which may to some extent improve the performance of the terminal device.

Figure 3:
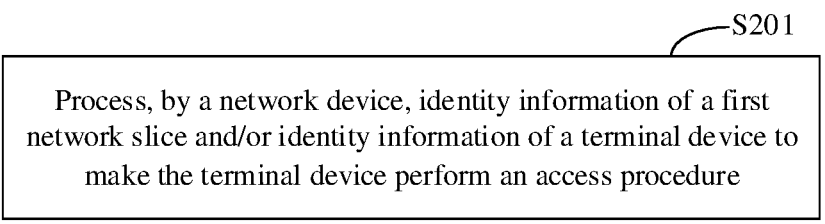
FIG. 3 is a flowchart of an information processing method on a network side according to an embodiment of the present disclosure.

Correspondingly, an embodiment of the present disclosure also provides an information processing method which is applied to a network device. Referring to FIG. 3, the method includes the following:

In S201, the network device processes identity information of a first network slice and/or identity information of a terminal device to make the terminal device perform an access procedure.

The network device in the embodiment of the present disclosure can determine its own behavior by processing the network slice identity information and/or the identity information of the terminal device, which can enable the terminal device to access a cell which can provide a network slice service meeting the terminal device's requirement, thereby achieving the purpose of improving the terminal device performance and the overall system performance.

The following describes the downlink procedure and the uplink procedure of embodiments of the present disclosure in detail, respectively, and accordingly describe various implementations of embodiments of the present disclosure.

Case 1: The Identity Information of the First Network Slice Corresponds to a Network Slice where Downlink Data for the Terminal Device is.

In some embodiments of the present disclosure, optionally, processing, by the terminal device, the identity information of the first network slice and the identity information of the terminal device includes: receiving, by the terminal device, a paging message sent from a network device, wherein the paging message includes the identity information of the terminal device and the identity information of the first network slice.

Optionally, the terminal device performs an access procedure towards a first cell and sends the identity information of the terminal device or the identity information of the first network slice to the network device.

Optionally, if the terminal device receives information of a predetermined type, the terminal device performs cell handover or cell reselection according to the information of the predetermined type.

According to some embodiments of the present disclosure, in a relevant application scenario, for example, if the core network starts a paging procedure when there is downlink service data to be sent to a terminal device, information about the slice to which the service transmission belongs (such as a slice ID) may be carried in the paging message, so that the slice identity information corresponding to the downlink service data may be notified to the network device. Accordingly, the network device may send a paging message to the terminal device and carry the identity information of the terminal device and the slice identity information in the paging message sent to the terminal device, so that the terminal device can know that there is downlink data to be received on the corresponding slice and the terminal device needs to access the network.

The terminal device performs the access procedure and sends its own identity such as UE ID to the network, or sends slice information such as slice ID carried in the paging message to the network as explicit indication information. Here, for example, since the UE ID and the slice ID are included in the paging message from the network device, the terminal may inform the network of the slice attribute information required for the service data by sending one of the UE ID and the slice ID.

The network device may determine whether to complete the access procedure of the terminal device to the current cell (e.g., called the first cell) based on whether the slice attribute supported by the current cell matches the slice attribute required by the terminal device. If the two slice attributes do not match, it means that the current cell cannot support data transmission on the slice and the terminal device should not access the current cell, and the network device sends a predetermined message to the terminal device, so that the terminal device does not access the current cell, but reconnects to another suitable cell (e.g., called a second cell), which may be a cell with a matching slice attribute.

In this way, according to the embodiments of the present disclosure, after the terminal device enters the connected state, if the slice resource of the cell does not meet the requirement, the terminal device can quickly access to a cell with a suitable slice resource, avoiding the situation that the terminal service cannot be carried out because the slice service of the accessed cell does not match the slice service required by the terminal device itself. The terminal device can provide services to a user after quickly accessing to another suitable cell, and thus the overall performance of the terminal device can be improved to a certain extent by using the embodiments of the present disclosure.

Accordingly, in the embodiments of the present disclosure, optionally, processing, by the network device, the identity information of the first network slice and the identity information of the terminal device includes: sending, by the terminal device, a paging message to the terminal device, wherein the paging message includes the identity information of the terminal device and the identity information of the first network slice, and the paging message is used for the terminal device to perform the access procedure.

Optionally, the network device receives the identity information of the terminal device or the identity information of first network slice sent from the terminal device.

Optionally, if the identity information of the first network slice does not match the network slice service supported by the network device, the network device sends information of the predetermined type to the terminal device. The information of the predetermined type is used for the terminal device to perform cell handover or cell reselection.

Using the embodiments of the present disclosure, the network device may determine whether to complete the access procedure of the terminal device to the current cell based on whether the slice attribute supported by the current cell matches the slice attribute required by the terminal device match. If the two slice attributes do not match, the network device sends a predetermined message to the terminal device, and the terminal device can quickly access to a cell with a suitable slice resource, so as to avoid a situation where terminal services cannot be carried out and the overall system performance may be deteriorated because the slice service of the accessed cell does not match the slice service required by the terminal device.

In an embodiment of the present disclosure, as previously described, the terminal device may send its own identity information (such as UE ID) or the first network slice identity information (such as slice ID) to the network device during the access procedure.

Specifically, the relevant information may be carried in the third step message msg3 or the fifth step message msg5 of the access procedure.

Optionally, msg3 includes the identity information of the terminal device, for example, UE ID is carried in msg3.

Optionally, msg5 includes the identity information of the first network slice, for example, slice ID is carried in msg5.

More specifically, optionally, the msg3 may include at least one of the following signaling: establishment request RRCSetupRequest signaling; resumption request RRCResumeRequest signaling; and reconnection request RRCRe-establishmentRequest signaling. One or more of the above signaling may be used to carry UE ID.

Optionally, the msg5 may include at least one of the following signaling: establishment completion RRCSetupCompletet signaling; resumption completion RRCResumeComplete signaling; and reconnection completion RRCRe-establishmentComplete signaling. One or more of the above signaling may be used to carry slice ID.

Correspondingly, the network device may determine the network slice information required by the terminal device based on the UE ID in msg3 or the slice ID in msg5. The following describes several examples.

For example, the paging message sent by the network device carries the UE ID and the information of the network slice required for service data transmission, such as the slice ID. For the terminal device in the idle state, after receiving the paging message, the terminal device compares the UE ID in the paging message with its own UE ID and determines that the UE ID in the paging message matches its own UE ID, and the terminal device starts the access procedure. The terminal device carries its own UE ID in the third step message msg3, for example, UE ID may be carried in the RRCSetupRequest.

Correspondingly, the network device receives msg3, the RRCSetupRequest contains the UE ID information. The UE ID may be at least one of the following:
 a) ng-5G-S-TMSI-Part1 (the rightmost 39 bits of ng-5G-STMSI);
 b) ShortI-RNTI-Value (ID with 24 bits); and
 c) RNTI-Value (ID with 40 bits).

According to the UE ID and the slice ID of the network slice required for service data transmission carried in the paging message, the network device may use the slice UD as the slice ID of the network slice service required for the UE message of which is received by the network device.

As another example, the paging message sent by the network device carries the UE ID and the information of the network slice required for service data transmission, such as the slice ID. For the terminal device in the idle state, after receiving the paging message, the terminal device compares the UE ID in the paging message with its own UE ID and determines that the UE ID in the paging message matches its own UE ID, and the terminal device starts the access procedure. The terminal device carries the slice ID obtained from the paging message in the fifth step message msg5, for example, slice ID may be carried in the RRCSetupComplete.

Correspondingly, the network device receives the slice ID of the first network slice in the RRCSetupComplete of msg5, i.e., the network device knows the slice ID of the network slice service required by the UE.

As another example, the paging message sent by the network device carries the UE ID and the information of the network slice required for service data transmission, such as the slice ID. For the terminal device in the inactive state, after receiving the paging message, the terminal device compares the UE ID in the paging message with its own UE ID and determines that the UE ID in the paging message matches its own UE ID, and the terminal device starts the RRC connection resumption procedure. The terminal device carries the slice ID obtained from the paging message in the fifth step message msg5, for example, slice ID may be carried in the RRCResumeComplete.

Correspondingly, the network device receives the slice ID of the first network slice in the RRCResumeComplete of msg5, i.e., the network device knows the slice ID of the network slice service required by the UE.

Further, optionally, the msg5 may further include existing neighbor cell measurement information for the terminal device. For example, msg5 carries the existing neighbor cell measurement information for the terminal device. Correspondingly, the network device may help the terminal device select or reselect to a cell that matches the currently required network slice service based on the neighbor cell measurement information in msg5, and the terminal device may re-initiate the access procedure to the cell that matches the currently required network slice service, so as to achieve fast handover.

The multiple embodiments described above may be understood as a way to explicitly notify the network slice identity information.

In some other embodiments of the present disclosure, a way of implicit notification may be used. For example, the terminal device may perform a random access procedure towards the first cell by applying a random access resource corresponding to the first network slice. Correspondingly, the network device may determine the network slice required by the terminal device based on the random access resource(s) used by the terminal device.

Optionally, the random access resource may include a random access preamble and/or a random access time-frequency location. Optionally, the indication information may be carried in a broadcast message or Radio Resource Control (RRC) information sent by the network device.

In this way, the network device in embodiments of the present disclosure can determine the information of the network slice required by the terminal device, and can thus determine whether the network slice service supported by the current cell matches the network slice service required by the terminal device.

Case 2: The Identity Information of the First Network Slice Corresponds to the Network Slice where Uplink Data of the Terminal Device is.

Optionally, in an embodiment of the present disclosure, processing, by the terminal device, the identity information of the first network slice and the identity information of the terminal device includes: performing, by the terminal device, an access procedure towards a first cell and sending the identity information of the terminal device and the identity information of the first network slice to the network device.

Optionally, the third step message msg3 includes the identity information of the terminal device and the identity information of the first network slice.

Optionally, the fifth step message msg5 includes the identity information of the terminal device and the identity information of the first network slice.

Correspondingly, the network device may receive the identity information of the terminal device and the identity information of the first network slice sent by the terminal device, e.g., the network device may obtain the UE ID and slice ID carried in msg3, or may also obtain the UE ID and slice ID carried in msg5.

As can be seen, unlike the downlink procedure described in Case 1, in the uplink procedure, the terminal device needs to report both the UE ID and the slice ID to the network device, so that the network device can determine whether the network slice service supported by the current cell matches the network slice service required by the terminal device based on the received slice ID.

Here, other information in the uplink procedure may be consistent with the information given in "Case 1" above, such as the possible signaling forms of msg3 and msg5 respectively, and msg5 may also include the neighbor cell measurement information measured by the terminal device in the idle state or the inactive state, etc., and repeated descriptions are omitted here.

Based on the various embodiments described above, for an access procedure triggered by a downlink paging message sent by the network device, or for an access procedure triggered by an uplink service data demand of the terminal device itself, the network device can know the identity information (slice ID) of the first network slice service required by the terminal device.

Then, if the identity information of the first network slice does not match the network slice service supported by the network device, the network device in embodiments of the present disclosure may send information of predetermined type to the terminal device. The information of the predetermined type is used for the terminal device to perform cell handover or cell reselection, that is, to perform fast cell handover or reselection.

Correspondingly, if the terminal device receives the information of the predetermined type, the terminal device performs cell handover or cell reselection according to the information of the predetermined type.

In different implementations of the present disclosure, the information of the predetermined type may be different, as described separately below.

Optionally, the information of the predetermined type includes a reject message, and the reject message includes information for indicating that a required network slice service is not supported.

Optionally, the reject message may further include redirection information and/or reselection priority information.

Specifically, first, the reject message may include a cause for rejecting terminal access, for example, information on the cause for rejection such as information that the required network slice service is not supported, or information about network slice mismatch and so on. Second, the reject message may further include redirection information and/or reselection priority information. Upon receiving the RRCReject signaling with the rejection cause: "the current required network slice service being not supported", the terminal immediately starts the cell selection/reselection procedure, selects/reselects to a cell that matches the current required network slice service, and reinitiates access. Optionally, the terminal device may select a cell to access based on the redirection and/or reselection priority information given in the RRC signaling. Optionally, the redirection information has cell ID related information, and the UE can redetermine a cell that is suitable for the network slice resource according to the information and initiate the access procedure to complete a fast access.

Optionally, the information of the predetermined type includes a release message, and the release message includes at least one of the following: redirect information; reselection priority information, and deprioritization request information. The UE can redetermine a cell that is suitable for the network slice resource according to the information and initiate the access procedure to complete a fast access.

Optionally, the information of the predetermined type includes a reconfiguration message, and the reconfiguration message includes at least one of the following information: a Radio Link Control protocol (RLC) bearer addition modification list; a RLC bearer release list; configuration information of a target cell; a Radio Network Temporary Identifier (RNTI) value configured by the target cell; and dedicated random access configuration information. The UE can redetermine a cell that is suitable for the network slice resource according to the information and initiate the access procedure to complete a fast access.

Optionally, the redirection information includes information about a frequency point corresponding to a second cell or identity (ID) information of the second cell. The frequency point corresponding to the second cell in the reselection priority information is of highest priority. The deprioritization request information is used for indicating whether a current frequency or Radio Access Technology (RAT) is deprioritized.

Using at least one of the above embodiments of the present disclosure, the network device may determine whether to complete the access procedure of the terminal device to the current cell based on whether the slice attribute supported by the current cell matches the slice attribute required by the terminal device. If the two slice attributes do not match, the network device sends a predetermined message to the terminal device, and the terminal device can quickly access to a cell with a suitable slice resource, so as to avoid a situation where terminal services cannot be carried out and the overall system performance may be deteriorated because the slice service of the accessed cell does not match the slice service required by the terminal device.

The following describes possible implementations of the embodiments of present disclosure by means of examples.

Embodiment 1

Figure 4:
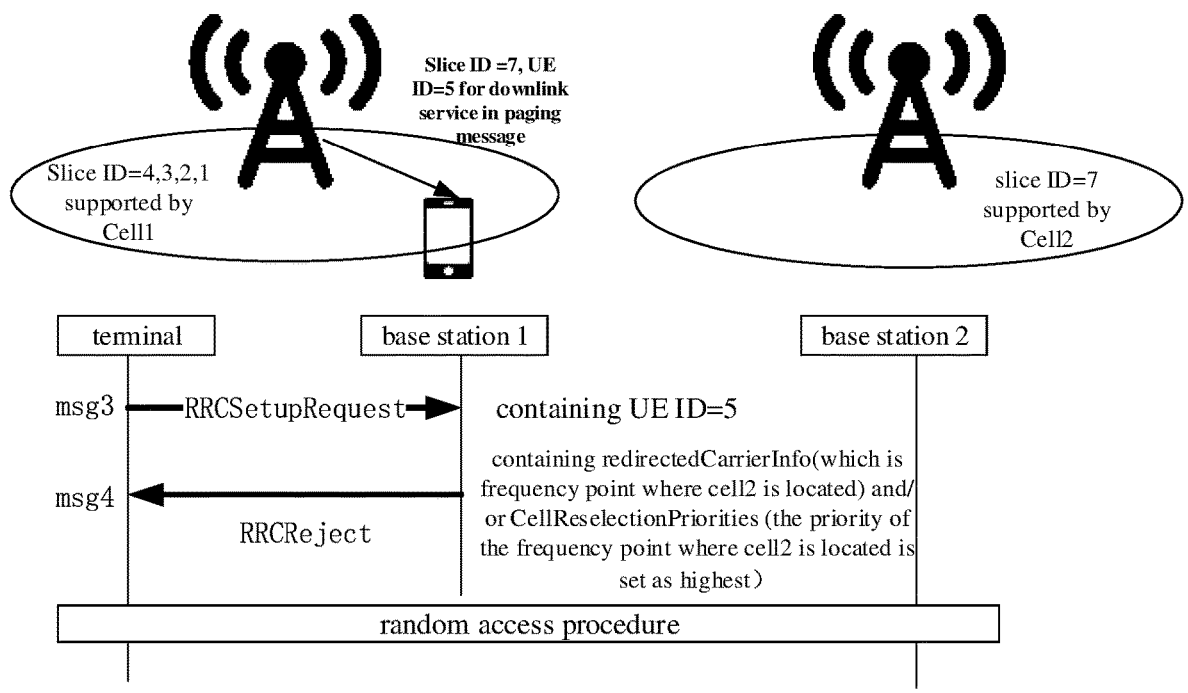
FIGS. 4-6 are schematic diagrams showing interaction logics of an information processing method according to multiple embodiments of the present disclosure.

Referring to FIG. 4, in this embodiment, the terminal device has UE ID=5. The terminal receives paging information from the network, where the pagingRecordlist contains a pagingRecord, content of which is {UE ID=5, slice ID=7}. The terminal compares the UE ID in the pagingRecord with its own UE ID and determines that the UE ID in the pagingRecord matches its own UE ID, and knows that the network has downlink data on a network slice with a slice ID of 7 that needs to be sent to the terminal, and the terminal needs to access the network. The terminal performs random access, in which msg3 RRCSetupRequest carries UE ID=5.

After receiving msg3, the network performs comparison with its own stored paging information, and knows that the terminal needs to access the network for the purpose of receiving downlink data on the network slice with network slice ID=7, and that the network device cannot support data transmission on this network slice. The network sends msg4 RRCSetupReject to the terminal, which contains information for redirection to a cell (e.g., Cell 2) that can support data transmission on the network slice with slice ID=7, such as the frequency point of the cell and/or the physical cell identity (PCI) of the cell that can support data transmission on the network slice with slice ID=7. The terminal initiates random access to Cell 2 to access the network.

Embodiment 2

Figure 5:
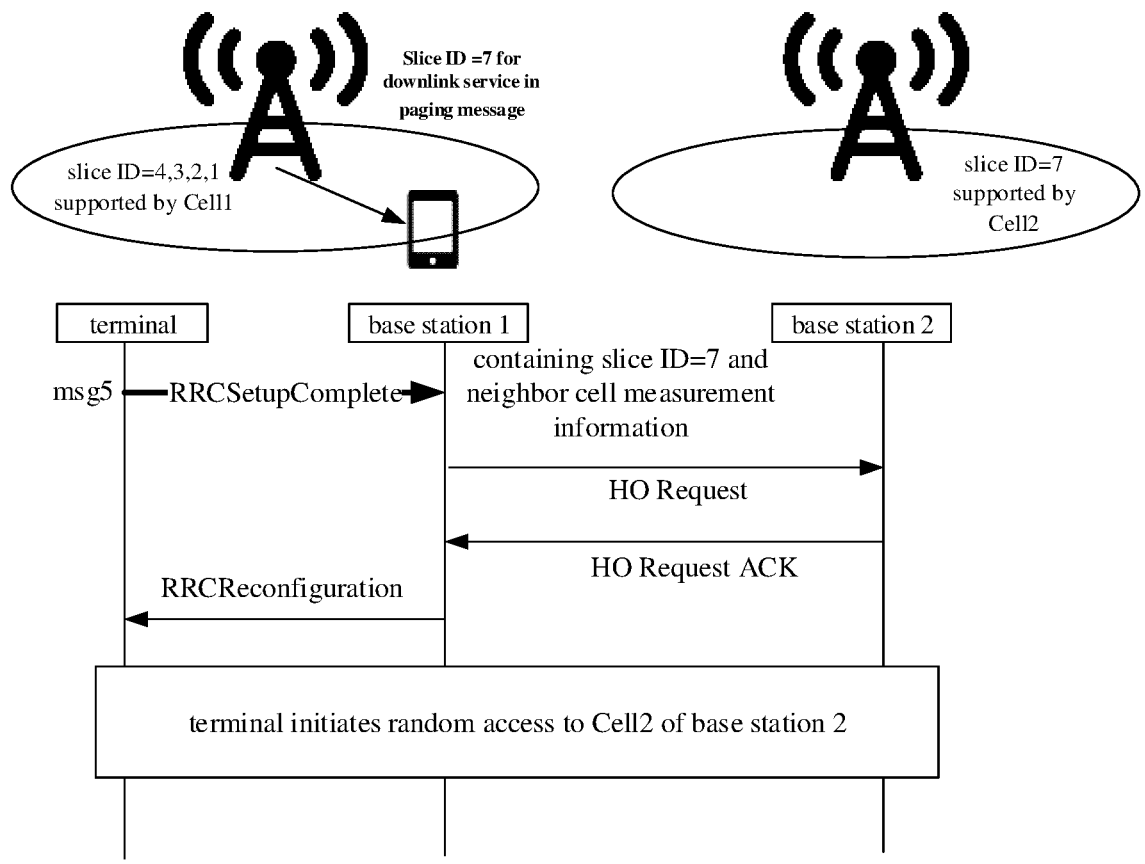

Referring to FIG. 5, in this embodiment, the terminal device has UE ID=5. The terminal receives paging information from the network, where the pagingRecordlist contains a pagingRecord, content of which is {UE ID=5, slice ID=7}. The terminal compares the UE ID in the pagingRecord with its own UE ID and determines that the UE ID in the pagingRecord matches its own UE ID, and knows that the network has downlink data on a network slice 7 that needs to be sent to the terminal, and the terminal needs to access the network. The terminal performs an access procedure, in which msg5 RRCSetupComplete carries slice ID=7 and neighbor cell measurement information measured in the idle state.

After receiving msg5, the network performs comparison with its own stored paging information, and knows that the terminal needs to access the network for the purpose of receiving downlink data on the network slice with network slice ID=7, and that the network device cannot support data transmission on this network slice. The base station 1 checks the neighbor cell measurement information sent by the terminal and finds that the signal quality of Cell 2 is relatively high, for example, the signal quality of Cell 2 is the highest among the cells supporting the network slice with slice ID=7, and finds that Cell 2 can support the network slice with slice ID=7 in the interaction between base stations. The base station 1 negotiates with the base station 2 to hand the terminal over to Cell 2. After the negotiation, base station 1 sends the RRCReconfiguration handover command to the terminal. The terminal initiates random access to Cell 2 of base Station 2 to access the network.

Embodiment 3

Figure 6:
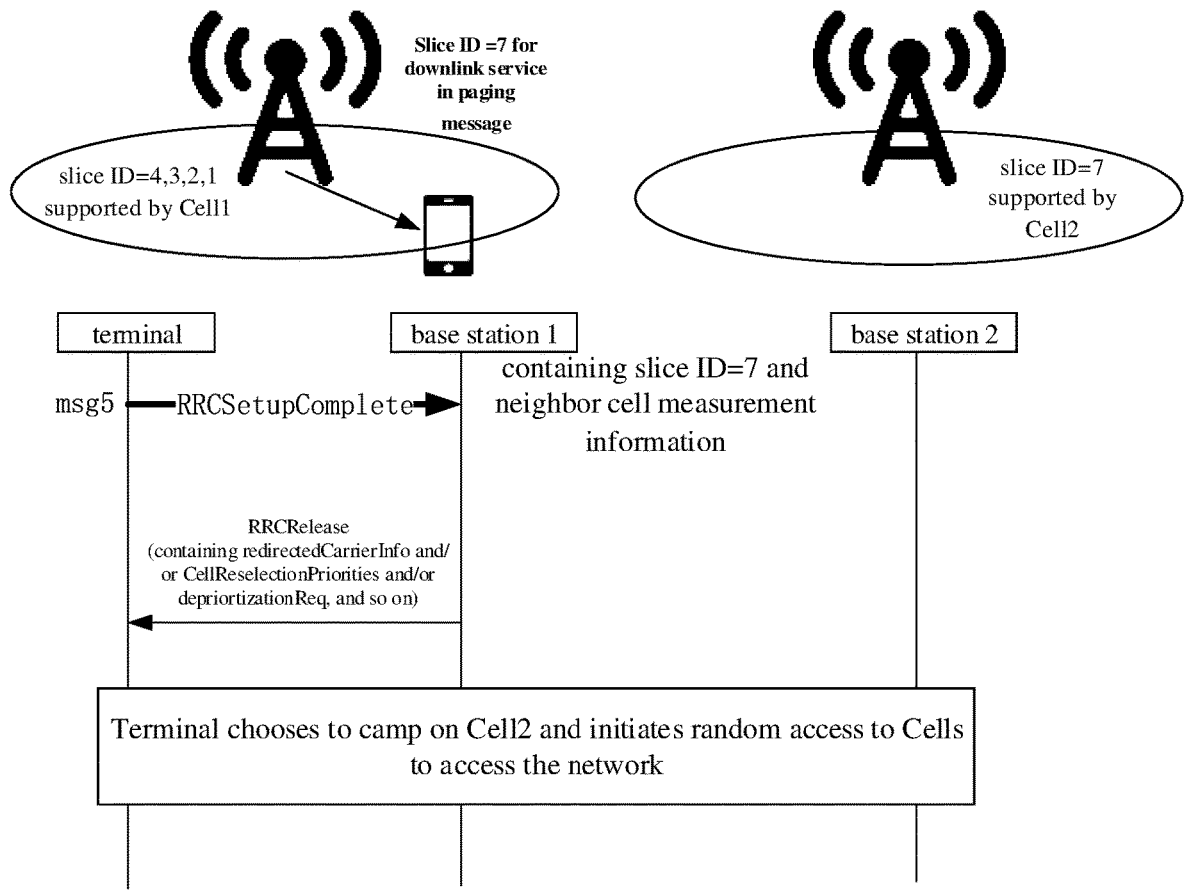

Referring to FIG. 6, in this embodiment, the terminal device has UE ID=5. The terminal receives paging information from the network, where the pagingRecordlist contains a pagingRecord, content of which is {UE ID=5, slice ID=7}. The terminal compares the UE ID in the pagingRecord with its own UE ID and determines that the UE ID in the pagingRecord matches its own UE ID, and knows that the network has downlink data on a network slice 7 that needs to be sent to the terminal, and the terminal needs to access the network. The terminal performs an access procedure, in which msg5 RRCSetupComplete carries slice ID=7 and neighbor cell measurement information measured in the idle state.

After receiving msg5, the network performs comparison with its own stored paging information, and knows that the terminal needs to access the network for the purpose of receiving downlink data on the network slice with network slice ID=7, and that the network device cannot support data transmission on this network slice. The base station 1 checks the neighbor cell measurement information sent by the terminal and finds that the signal quality of Cell 2 is relatively high, for example, the signal quality of Cell 2 is the highest among the cells supporting the network slice with slice ID=7, and finds that Cell2 can support the network slice with slice ID=7 in the interaction between base stations. The base station 1 sends RRCRelease signaling to the terminal, which contains necessary information for redirecting the terminal to Cell2, such as redirectedCarrierInfo being set to the frequency point where Cell2 is located and/or the reselection priority of Cell2 being set to the highest. The terminal chooses to camp on Cell2 and initiates random access to Cell 2 to access the network.

Figure 7:
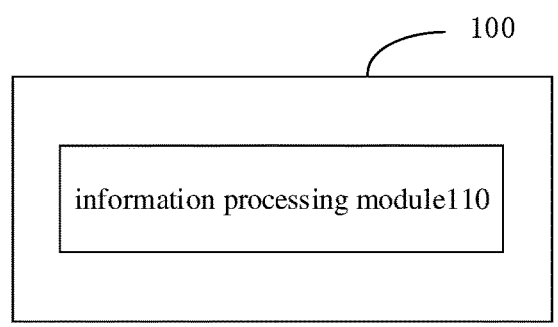
FIG. 7 is a block diagram of a schematic structure of a terminal device according to an embodiment of the present disclosure.

The above describes the example settings and implementations of the embodiments of the present disclosure from different perspectives through multiple embodiments. Corresponding to the processing method of at least one of the above embodiments, an embodiment of the present disclosure further provides a terminal device 100. Referring to FIG. 7, the terminal device 100 includes an information processing module 110.

The information processing module 110 is configured to process identity information of a first network slice and/or identity information of the terminal device to perform an access procedure.

Figure 8:
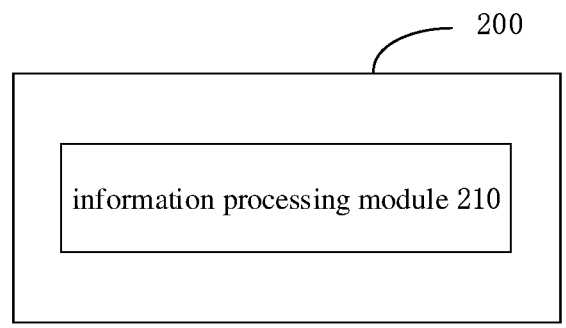
FIG. 8 is a block diagram of a schematic structure of a network device according to an embodiment of the present disclosure.

Corresponding to the processing method of at least one of the above embodiments, an embodiment of the present disclosure further provides a terminal device 200. Referring to FIG. 8, the network device 200 includes an information processing module 210.

The information processing module 210 is configured to process identity information of a first network slice and/or identity information of a terminal device to make the terminal device perform an access procedure.

The terminal device 100 and the network device 200 in embodiments of the present disclosure are capable of realizing the corresponding functions of the terminal device in the aforementioned method embodiments. For the corresponding processes, functions, implementations, and beneficial effects of each module (submodule, unit, or component, etc.) in the terminal device 100 and the network device 200, reference may be made to the corresponding descriptions in the aforementioned method embodiments, and will not be repeated here.

It should be noted that the functions described for each module (submodule, unit or component, etc.) in the terminal device 100 and the network device 200 in embodiments of the present disclosure can be implemented by different modules (submodules, units or components, etc.) or by the same module (submodule, unit or component, etc.). For example, the first sending module and the second sending module can be different modules, or may be the same module, both of which can realize the corresponding functions of the terminal device in embodiments of the present disclosure.

Figure 9:
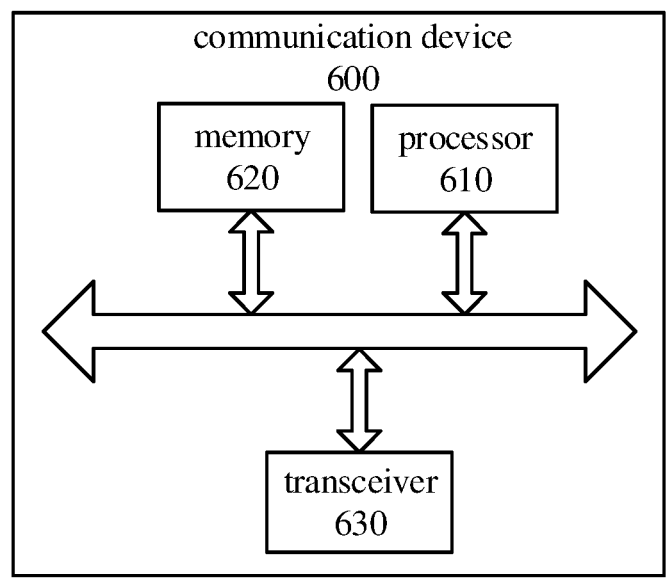
FIG. 9 is a schematic block diagram of a communication device according to an embodiment of the present disclosure.

FIG. 9 is a schematic structural diagram of a communication device 600 according to an embodiment of the present disclosure. The communication device 600 includes a processor 610, and the processor 610 may call and run a computer program from a memory to perform the method in embodiments of the present disclosure.

According to embodiments, the communication device 600 may further include a memory 620. The processor 610 may call and run a computer program from the memory 620 to perform the method in embodiments of the present disclosure.

The memory 620 may be a separate device independent of the processor 610, or may be integrated in the processor 610.

According to embodiments, the communication device 600 may further include a transceiver 630, and the processor 610 may control the transceiver 630 to communicate with other devices. Specifically, the transceiver may send information or data to other devices, or receive information or data sent by other devices.

The transceiver 630 may include a transmitter and a receiver. The transceiver 630 may further include one or more antennas.

According to embodiments, the communication device 600 may be the network device according to an embodiment of the present disclosure, and the communication device 600 may implement the corresponding processes implemented by the network device in the method embodiments of the present disclosure.

According to embodiments, the communication device 600 may be the terminal device in embodiments of the present disclosure, and the communication device 600 may implement the corresponding processes implemented by the terminal device in the method embodiments of the present disclosure. For brevity, details are not repeated here.

Figure 10:
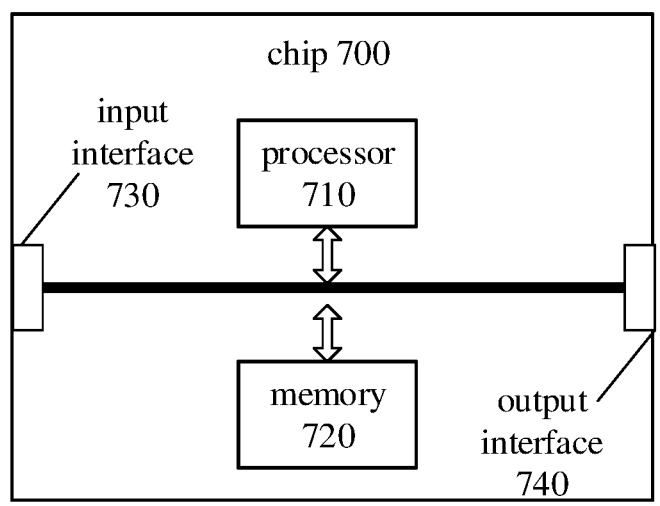
FIG. 10 is a schematic block diagram of a chip according to an embodiment of the present disclosure.

FIG. 10 is a schematic structural diagram of a chip 700 according to an embodiment of the present disclosure. The chip 700 includes a processor 710, and the processor 710 can call and run a computer program from a memory to implement the method according to embodiments of the present disclosure.

According to embodiments, the chip 700 may further include a memory 720. The processor 710 may call and run a computer program from the memory 720 to implement the method according to embodiments of the present disclosure.

The memory 720 may be a separate device independent of the processor 710, or may be integrated in the processor 710.

According to embodiments, the chip 700 may further include an input interface 730. The processor 710 may control the input interface 730 to communicate with other devices or chips, and specifically, the processor 710 can control the input interface to obtain information or data sent by other devices or chips.

According to embodiments, the chip 700 may further include an output interface 740. The processor 710 can control the output interface 740 to communicate with other devices or chips, and specifically, the processor 710 can control the output interface 740 to output information or data to other devices or chips.

According to embodiments, the chip can be applied to the network device in embodiments of the present disclosure, and the chip can implement the corresponding processes implemented by the network device in various methods according to embodiments of the present disclosure. For brevity, details are not repeated herein again.

According to embodiments, the chip can be applied to the terminal device in embodiments of the present disclosure (as shown in FIG. 7), and the chip can implement the corresponding processes implemented by the terminal device in various methods according to embodiments of the present disclosure. For brevity, details are not repeated herein again.

It should be understood that the chip in the embodiments of the present disclosure may also be referred to as a system-level chip, a system chip, a chip system, or a system-on-chip, etc.

The above-mentioned processor may be a general-purpose processor, a Digital Signal Processor (DSP), a Field Programmable Gate Array (FPGA), an Application Specific Integrated Circuit (ASIC), or other programmable logic device, transistor logic device, or discrete hardware component. The general-purpose processor may be a microprocessor or any conventional processor or the like.

The memory in the embodiments of the present disclosure may be volatile memory or non-volatile memory, or may include both volatile and non-volatile memory. The non-volatile memory can be Read-Only Memory (ROM), Programmable ROM (PROM), Erasable PROM (EPROM), Electrically EPROM (EEPROM) or flash memory. The volatile memory may be a Random Access Memory (RAM).

It should be understood that the foregoing memory is exemplary but not restrictive. For example, the memory in embodiments of the present disclosure may also be Static RAM (SRAM), Dynamic RAM (DRAM), Synchronous DRAM (SDRAM), Double Data Rate SDRAM (DDR SDRAM), Enhanced SDRAM (ESDRAM), Synchlink DRAM (SLDRAM), or Direct Rambus RAM (DR RAM), and so on. That is to say, the memory in embodiments of the present disclosure is intended to include but not limited to these and any other suitable types of memory.

Figure 11:
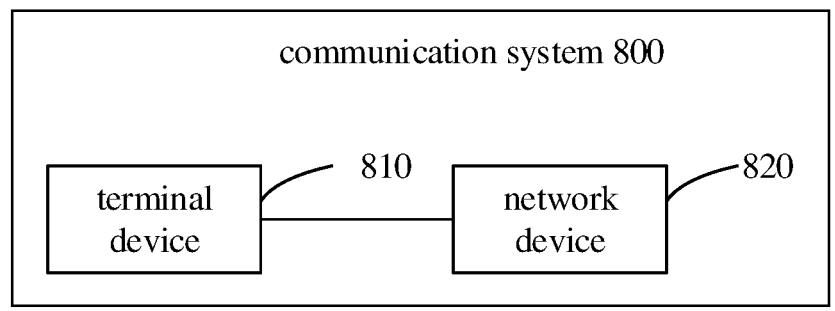
FIG. 11 is a schematic block diagram of a communication system according to an embodiment of the present disclosure.

FIG. 11 is a schematic block diagram of a communication system 800 according to an embodiment of the present disclosure. The communication system 800 includes a terminal device 810 and a network device 820.

The terminal device 810 may be used to implement the corresponding functions implemented by the terminal device in the methods of the various embodiments of the present disclosure, and the network device 820 may be used to implement the corresponding functions implemented by the network device in the methods of the various embodiments of the present disclosure. For the sake of brevity, repeated descriptions are omitted here.

The above-mentioned embodiments may be implemented in whole or in part by software, hardware, firmware or any combination thereof. When implemented in software, the embodiments can be implemented in whole or in part in the form of a computer program product. The computer program product includes one or more computer instructions. When the computer program instructions are loaded and executed on a computer, all or part of the processes or functions described in the embodiments of the present disclosure are produced. The computer may be a general purpose computer, a special purpose computer, a computer network, or other programmable device. The computer instructions may be stored in a computer-readable storage medium or transmitted from one computer-readable storage medium to another computer-readable storage medium, for example, the computer instructions may be transmitted from a website, computer, server, or data center to another website, computer, server, or data center in a wired manner (e.g., via coaxial cable, optical fiber, Digital Subscriber Line (DSL)) or in a wireless manner (e.g., via infrared, wireless, microwave, etc.). The computer-readable storage medium may be any available medium that can be accessed by a computer or a data storage device such as a server, data center, etc. that includes an integration of one or more available medium. The available medium may be magnetic medium (e.g., floppy disks, hard disks, magnetic tapes), optical medium (e.g., Digital Video Disc (DVD)), or semiconductor medium (e.g., Solid State Disk (SSD)), and so on.

It can be understood that, in the embodiments of the present disclosure, the sequence numbers of the above-mentioned processes do not imply the order of execution, and the execution order of each process should be determined by its functions and internal logic, and these sequence numbers should not be construed as any limitation on the implementation of the present disclosure.

It may be clearly understood by those skilled in the art that details of specific operation procedures of the systems, devices and units can be found in the previous description regarding the method embodiments.

The foregoing descriptions are merely exemplary embodiments of the present disclosure, but the protection scope of the present disclosure is not limited thereto. Any person skilled in the art can easily think of changes or substitutions within the technical scope of the present disclosure, and all the changes or substitutions should be covered by the protection scope of the present disclosure. Therefore, the protection scope of the present disclosure should be defied by the appended claims.

What is claimed is:

1. An information processing method, applied to a terminal device, the method comprising:
processing, by the terminal device, identity information of a first network slice and identity information of the terminal device to perform an access procedure;
wherein the identity information of the first network slice corresponds to a network slice where uplink data of the terminal device is;
wherein processing, by the terminal device, the identity information of the first network slice and the identity information of the terminal device comprises:
performing, by the terminal device, an access procedure towards a first cell and sending the identity information of the terminal device and the identity information of the first network slice to the network device;
wherein a fifth step message msg5 in the access procedure comprises the identity information of the terminal device and the identity information of the first network slice, and the fifth step message msg5 further comprises neighbor cell measurement information measured by the terminal device in an idle state;
wherein the method further comprises:
in response to the terminal device receiving a reconfiguration message, performing, by the terminal device, cell handover according to the reconfiguration message;
wherein the reconfiguration message comprises configuration information of a second cell and dedicated random access configuration information, and the second cell is a cell having a highest signal quality among cells that support the first network slice in the neighbor cell measurement information.

2. An information processing method, applied to a network device, the method comprising:

processing, by the network device, identity information of a first network slice and identity information of a terminal device to make the terminal device perform an access procedure;

wherein the identity information of the first network slice corresponds to a network slice where uplink data of the terminal device is;

wherein processing, by the network device, identity information of the first network slice and identity information of the terminal device comprises:

receiving, by the network device, the identity information of the terminal device and the identity information of the first network slice sent by the terminal device;

wherein a fifth step message msg5 in the access procedure comprises the identity information of the terminal device and the identity information of the first network slice, and the fifth step message msg5 further comprises neighbor cell measurement information measured by the terminal device in an idle state;

wherein the method further comprises:

in response to that the identity information of the first network slice does not match a network slice service supported by the network device, sending, by the network device, a reconfiguration message to the terminal device;

wherein the reconfiguration message comprises configuration information of a second cell and dedicated random access configuration information, and the second cell is a cell having a highest signal quality among cells that support the first network slice in the neighbor cell measurement information.

3. A terminal device, comprising:

a processor; and a memory storing instructions executable by the processor;

wherein when the instructions are executed by the processor, the terminal device is caused to:

process identity information of a first network slice and identity information of the terminal device to perform an access procedure;

wherein the identity information of the first network slice corresponds to a network slice where uplink data of the terminal device is;

wherein when the instructions are executed by the processor, the terminal device is caused to:

perform an access procedure towards a first cell and sending the identity information of the terminal device and the identity information of the first network slice to the network device;

wherein a fifth step message msg5 in the access procedure comprises the identity information of the terminal device and the identity information of the first network slice, and the fifth step message msg5 further comprises neighbor cell measurement information measured by the terminal device in an idle state;

wherein when the instructions are executed by the processor, the terminal device is caused to:

in response to the terminal device receiving a reconfiguration message, perform cell handover according to the reconfiguration message;

wherein the reconfiguration message comprises configuration information of a second cell and dedicated random access configuration information, and the second cell is a cell having a highest signal quality among cells that support the first network slice in the neighbor cell measurement information.

4. The method according to claim 1, wherein the reconfiguration message further comprises at least one of:
 a Radio Link Control protocol (RLC) bearer addition modification list;
 a RLC bearer release list; or
 a Radio Network Temporary Identifier (RNTI) value configured by the second cell.

5. The method according to claim 1, wherein the reconfiguration message is a RRCReconfiguration handover command.

6. The method according to claim 2, wherein the reconfiguration message further comprises at least one of:
 a Radio Link Control protocol (RLC) bearer addition modification list;
 a RLC bearer release list; or
 a Radio Network Temporary Identifier (RNTI) value configured by the second cell.

7. The method according to claim 2, wherein the reconfiguration message is a RRCReconfiguration handover command.

8. The terminal device according to claim 3, wherein the reconfiguration message further comprises at least one of:
 a Radio Link Control protocol (RLC) bearer addition modification list;
 a RLC bearer release list; or
 a Radio Network Temporary Identifier (RNTI) value configured by the second cell.

9. The terminal device according to claim 3, wherein the reconfiguration message is a RRCReconfiguration handover command.

* * * * *